(12) United States Patent
Houston et al.

(10) Patent No.: US 6,412,058 B1
(45) Date of Patent: *Jun. 25, 2002

(54) ADAPTIVE HEAD ADDRESS RE-MAP FOR DATA STORAGE DEVICES

(75) Inventors: George Robert Houston, San Jose; Bernd Lamberts, Cupertino; Mantle Man-Hon Yu, San Jose, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,012

(22) Filed: Apr. 27, 1999

(51) Int. Cl.$^7$ .......................... G06F 13/00; G06F 13/28
(52) U.S. Cl. .......................... 711/202; 711/4; 711/112; 711/113; 711/151; 711/158; 360/27; 360/75; 360/76; 360/53
(58) Field of Search .............. 711/202, 4, 203, 711/112–113, 151, 158; 360/27, 75–76, 53; 359/22

(56) References Cited

U.S. PATENT DOCUMENTS

| | | | |
|---|---|---|---|
| 5,375,020 A | 12/1994 | Aggarwal et al. ............. 360/75 |
| 5,526,201 A | 6/1996 | Takata et al. ............ 360/77.04 |
| 5,596,736 A | * 1/1997 | Kerns ............................. 711/4 |
| 5,638,225 A | 6/1997 | Tsuboi et al. ................. 360/27 |
| 5,760,993 A | 6/1998 | Purkett ......................... 359/22 |
| 5,787,482 A | * 7/1998 | Chen et al. ................. 711/158 |
| 5,822,142 A | * 10/1998 | Hicken ......................... 360/53 |
| 5,835,299 A | 11/1998 | Lee et al. ..................... 360/76 |
| 6,034,837 A | * 3/2000 | Purkett ........................ 360/78 |
| 6,185,653 B1 | * 2/2001 | Yanai et al. .................... 711/4 |

OTHER PUBLICATIONS

A. Ganguly and B. Spaeth, "Increased Direct–Access Storage Device Yield Through Defective Track Handling in Hardware", IBM Technical Disclosure Bulletin, vol. 24, No. 1B, Jun. 1981, pp. 625–627.

* cited by examiner

*Primary Examiner*—Do Hyun Yoo
*Assistant Examiner*—Mehdi Namazi
(74) *Attorney, Agent, or Firm*—Gates & Cooper LLP

(57) ABSTRACT

A system, method, and article of manufacture for adaptive re-mapping of head addresses in a data storage device. A logical address received by the data storage device is converted into a corresponding physical address, such as cylinder or track, read/write head, and sector. The selection of the read/write head is then re-mapped by the data storage device to a more optimal selection. Thereafter, the desired operation can be performed using the physical address including the re-mapped selection of the read/write heads.

24 Claims, 2 Drawing Sheets

ADAPTIVE HEAD ADDRESS RE-MAP FOR DATA STORAGE DEVICES

BACKGROUND OF THE INVENTION

1. Field of the Invention

The present invention relates generally to servo control systems used for positioning read/write transducers in data storage devices, and more particularly, to a system and method providing an adaptive re-mapping of head addresses in the data storage device.

2. Description of Related Art

It is well known in the art to store data on magnetic or optical disk drives. Data is stored on a disk drive on one or more tracks of predetermined format disposed on a disk-shaped recording media. The data is written to and read from the tracks using one or more transducers, which typically comprise read/write heads. Reading data from a desired one of the tracks on the disk surfaces requires knowledge of the read/write head position relative to the track as the disk rotates and the head is moved across the disk, and requires precise centering of the head over the disk track. Conventionally, the read/write head is mounted on a head positioning assembly that is moved by a servo control.

When a read/write command is issued by a host computer, it generally comprises a logical address, such as a logical block address. This logical address is converted by the servo control into a physical address, such as a cylinder, read/write head, and sector. The servo control then operates the head positioning assembly to move the read/write head to the position corresponding to the physical address for the reading and writing of data.

Generally, the conversion of a sequence of logical addresses to their physical addresses follows a certain sequence of head switching. Usually, the servo control is programmed with a predetermined head switching sequence, even though it may not be the most optimal head switching sequence. Thus, there is a need in the art for improved methods for adaptively re-mapping head address selections in order to provide the most optimal sequence.

SUMMARY OF THE INVENTION

To minimize the limitations in the prior art described above, and to minimize other limitations that will become apparent upon reading and understanding the present specification, the present invention discloses a system and method for adaptive re-mapping of head addresses in a data storage device. A logical address received by the data storage device is converted into a corresponding physical address, such as cylinder or track, read/write head, and sector. The selection of the read/write head is then re-mapped by the data storage device to a more optimal selection. Thereafter, the desired operation can be performed using the physical address including the re-mapped selection of the read/write heads.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized and structural changes may be made without departing from the scope of the present invention.

Disk Drive Components

Figure 1:
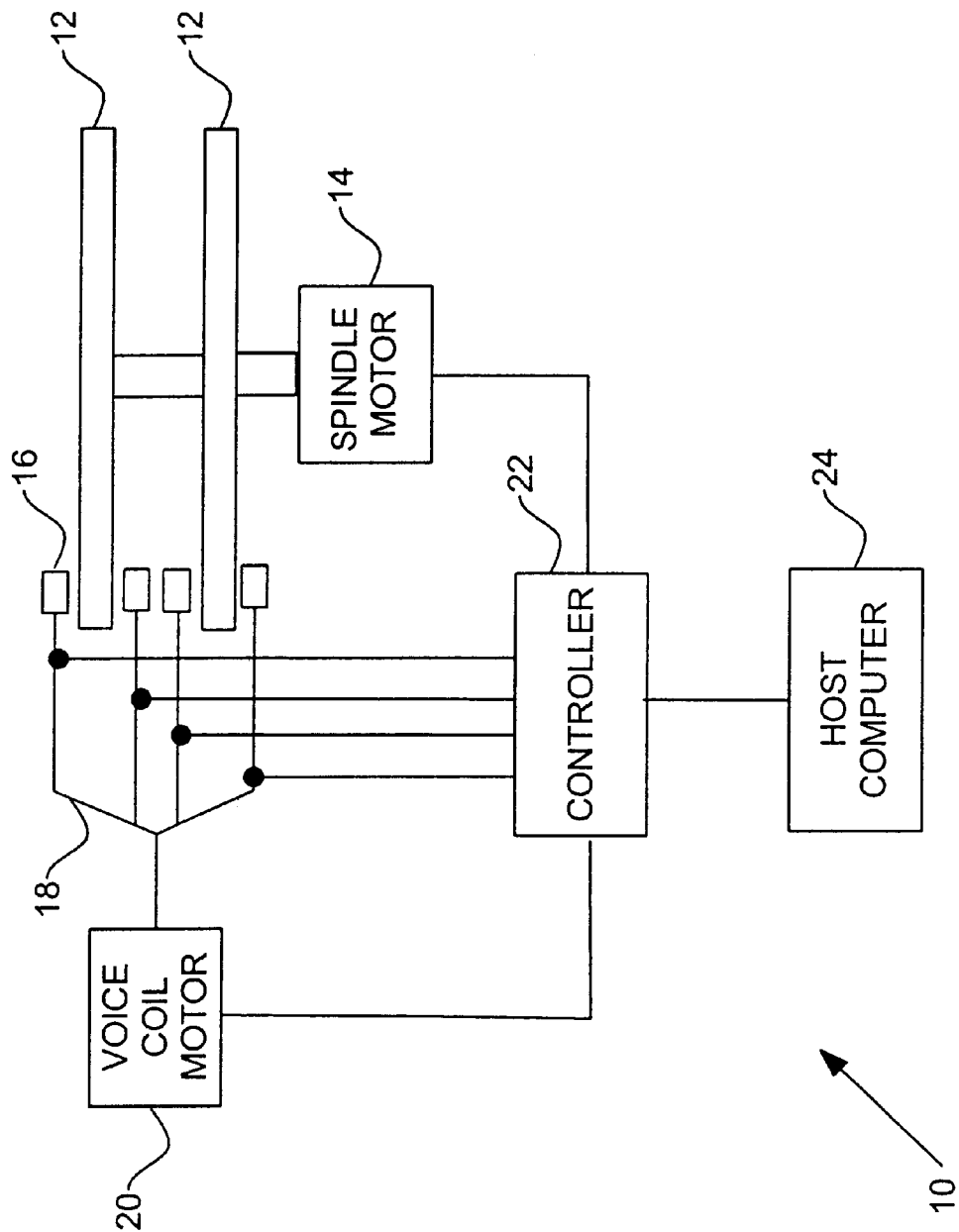
FIG. 1 is an illustration of an exemplary disk drive according to the preferred embodiment of the present invention.

FIG. 1 is a block diagram of an exemplary disk drive 10 according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 10 stores information on the surfaces of one or more stacked disks 12 in the form of transitions or patterns formed on one or more data tracks. The disks 12 are rotatably mounted on a spindle motor 14. Transitions are sensed or "read" from the disk 12 surfaces via one or more transducers 16, known as read/write heads, supported in close proximity to the disk 12 surfaces by a head positioning assembly 18, wherein the transducers 16 convert the transitions into electrical signals. The head positioning assembly 18 positions the transducers 16 over the disk 12 surfaces in a linear or rotary manner by operation of a voice coil motor (VCM) 20, which is controlled by a servo control loop that includes a servo controller 22.

Data is organized on the disks 12 using a series of concentric, radially spaced tracks, wherein a "cylinder" comprises a stack of these tracks across multiple disk 12 surfaces. Each track is divided into a plurality of sectors formatted in a predetermined, standard manner. The format specifies the sequence and location of certain types of information such as track number, sector number, data field, etc. A number of different formats may be used for the tracks.

When a read/write command is issued by a host computer 24, the servo controller 22 (or an interface processor or some other electronics within the disk drive 10) converts logical addresses, i.e., logical block addresses, into their respective physical addresses, i.e., cylinder, read/write head, and sector, and then proceeds to read from and/or write to the data at the physical addresses by moving the read/write heads to the corresponding position on the disk 12 surfaces.

For example, using a conventional track format for a single disk 12 having two recording surfaces, each track switch requires a head 16 switch operation from head #0 to head #1, or from head #1 to head #0, with the switch from head #1 to head #0 also incrementing the cylinder number. In this format, the sequence is cylinder 0—head 0 (track 0), cylinder 0—head 1 (track 1), cylinder 1—head 0 (track 2), etc., across the surface of the disk 12 from its outer diameter to its inner diameter. Alternative formats include sequential track format and zoned-sequential track format, among others.

The present invention addresses the track format of disk drives 12 and the way that the read/write heads 16 are controlled in response thereto. As noted above, there are a number of different track formats available, as well as a number of different options regarding the sequence of head 16 switches corresponding to those track formats. Some options may favor head 16 switches over track-to-track switches, whereas other options may favor track-to-track switches over head 16 switches, or may differ in the head 16 switching sequence, e.g., all even heads 16 first, or all odd heads 16 first, or head #0 to head #N followed by head #N to head #0, etc.

Common to all these schemes is a certain complexity in the programming of the disk drive 10, in order to convert a sequence of logical addresses into a sequence of physical addresses that may include a sequence of head 16 switches. The present invention reduces this complexity and therefore increases design robustness by encapsulating read/write head 16 mappings within the disk drive 10, so that the. read/write head 16 mappings may be changed as desired or required. When requests are received from the host computer 24 that address data on the disk drive 10 using one head 16 mapping scheme, the heads 16 are re-mapped using another more optimal scheme. Specifically, the read/write head 16 mappings can be changed as desired or required.

For example, for a particular disk drive 10, the originally programmed sequence of head 16 switches may be inefficient and another sequence of head 16 switches may be more optimal. Inefficiency and optimality may depend on any number of factors, such as the precision or alignment of parts within the disk drive 10, or the type of application accessing the disk drive 10, e.g., purely sequential access of video data streams versus highly random access of database tables, or in light on empirical knowledge concerning the performance of the disk drive 10 in various scenarios.

In one embodiment of the present invention, the optimal head 16 switching sequence is determined during manufacturing, programming is provided within the disk drive 10 to map the heads 16 accordingly, and the disk drive 10 is formatted in accordance with the programming. In another embodiment of the present invention, the optimal head 16 switching sequence is determined during field engineering, the disk drive 10 is dynamically re-programmed to map the heads 16 accordingly, and the disk drive 10 is re-formatted in accordance the re-programming.

Logic of the Preferred Embodiment

Figure 2:
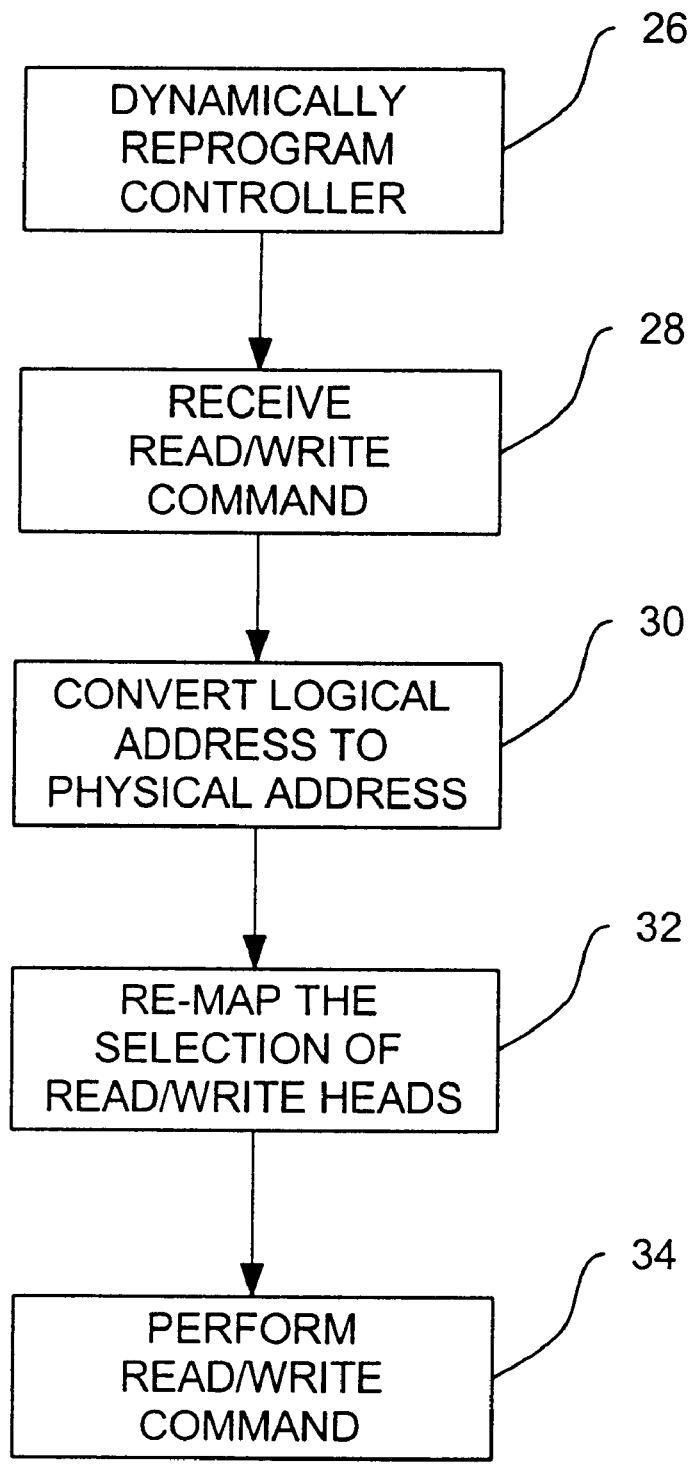
FIG. 2 is a flowchart that illustrates the logic performed by preferred embodiment of the present invention.

FIG. 2 is a flow chart illustrating the logic performed by the preferred embodiment of the present invention in the adaptive re-mapping of head 16 addresses in the disk drive 10.

Block 26 represents the disk drive 10 being dynamically re-programmed to specify the best head 16 switching sequence. Generally, this dynamically re-programming of the disk drive 10 is performed during the manufacturing (and formatting) of the disk drive 10 or during field engineering (and re-formatting) of the disk drive 10.

Block 28 represents the disk drive 10 receiving a read/write command, wherein the command includes a logical address for data stored on the disk drive 10.

Block 30 represents the disk drive 10 (specifically, specifically, the interface processor code of the controller 22, an interface processor, or some other device within the disk drive 10) converting the logical address into a corresponding physical address for the disk drive 10, wherein the physical address includes a selection of one or more read/write heads 16.

Block 32 represents the disk drive 10 (specifically, the adaptive head address re-mapping code of the servo controller 22, an interface processor, or some other device within the disk drive 10) re-mapping the selection of the read/write heads 16 to a more optimal selection of the read/write heads 16. Generally, this optimal selection may comprise an optimal sequence of read/write head 16 selections.

Block 34 represents the disk drive 10 performing the read/write command using the physical address including the re-mapped selection of the read/write heads 16.

Conclusion

This concludes the description of the preferred embodiment of the present invention. Generally, preferred embodiment of the present invention is implemented as programming within a servo controller, an interface controller, or some other device within the disk drive. This programming comprises instructions and/or data that is embodied in or retrievable from a device, medium, or carrier. Moreover, these instructions and/or data, when read, executed, and/or interpreted, perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions embodied in or accessible from any device, carrier, or media.

Of course, those skilled in the art will recognize many modifications may be made to this implementation without departing from the scope of the present invention. Indeed, those skilled in the art will recognize that any combination of the above components, or any number of different components, including programmable or non-programmable devices and circuits, may be used to implement the present invention, so long as similar functions are performed thereby.

In addition, the present invention can be applied to any number of different data storage devices. For example, any type of rotating data storage device, such as a magnetic, optical, or other device, could benefit from the present invention. Moreover, different electronics or logic could be used to implement the present invention.

In conclusion, the present invention discloses a system and method for adaptive re-mapping of head addresses in a data storage device. A logical address received by the controller is converted into a corresponding physical address, such as cylinder or track, read/write head, and sector. The selection of the read/write head is then re-mapped by the controller to a more optimal selection. Thereafter, the desired operation can be performed using the physical address including the re-mapped selection of the read/write heads.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for adaptive re-mapping of head addresses in a data storage device, comprising:

receiving a command at the data storage device, wherein the command includes a logical address for data stored on the data storage device;

converting the logical address into a corresponding physical address for the data storage device, wherein the physical address includes a selection of one or more read/write heads;

re-mapping the selection of the read/write heads in the data storage device to a more optimal selection of the read/write heads before performing the command; and performing the command at the data storage device using the physical address including the re-mapped selection of the read/write heads.

2. The method of claim 1, wherein the re-mapped selection of the read/write heads corresponds to an optimal sequence of read/write head selections.

3. The method of claim 1, wherein the re-mapped selection of the read/write head corresponds to a different track format for the data storage device.

4. The method of claim 1, wherein the more optimal selection of the read/write heads is based on a type of application accessing the data storage device.

5. The method of claim 1, wherein the more optimal selection of the read/write heads is based on empirical knowledge of the data storage device's performance.

6. The method of claim 1, further comprising dynamically re-programming the data storage device in order to perform the re-mapping step.

7. The method of claim 6, wherein the dynamically re-programing step is performed during manufacturing of the data storage device.

8. The method of claim 6, wherein the dynamically re-programming step is performed during field engineering of the data storage devices.

9. A data storage device, comprising:

one or more recording surfaces, one or more read/write heads for writing data to the recording surfaces and for reading data from the recording surfaces, and means for performing adaptive re-mapping of the read/write heads, further comprising:
  means for receiving a command including a logical address for data stored on the data storage device,
  means for converting the logical address into a corresponding physical address including a selection of one or more of the read/write heads,
  means for re-mapping the selection of the read/write heads to a more optimal selection of the read/write heads before performing the command, and
  means for performing the command using the physical address including the re-mapped selection of the read/write heads.

10. The data storage device of claim 9, wherein the re-mapped selection of the read/write heads corresponds to an optimal sequence of read/write head selections.

11. The data storage device of claim 9, wherein the re-mapped selection of the read/write head corresponds to a different track format for the data storage device.

12. The data storage device of claim 9, wherein the more optimal selection of the read/write heads is based on a type of application accessing the data storage device.

13. The data storage device of claim 9, wherein the more optimal selection of the read/write heads is based on empirical knowledge of the data storage device's performance.

14. The data storage device of claim 9, wherein the data storage device is dynamically re-programmed in order to re-map the selection of read/write heads.

15. The data storage device of claim 14, wherein the data storage device is dynamically re-programmed during manufacturing.

16. The data storage device of claim 14, wherein the data storage device is dynamically re-programmed during field engineering.

17. An article of manufacture embodying logic for adaptive re-mapping of head addresses in a data storage device, comprising:

receiving a command at a data storage device, wherein the command includes a logical address for data stored on the data storage device;

converting the logical address into a corresponding physical address for the data storage device, wherein the physical address includes a selection of one or more read/write heads;

re-mapping the selection of the read/write heads in the data storage device to a more optimal selection of the read/write heads before performing the command; and performing the command at the data device using the physical address including the re-mapped selection of the read/write heads.

18. The logic of claim 17, wherein the re-mapped selection of the read/write heads corresponds to an optimal sequence of read/write head selections.

19. The logic of claim 17, wherein the re-mapped selection of the read/write head corresponds to a different track format for the data storage device.

20. The logic of claim 17, wherein the more optimal selection of the read/write heads is based on a type of application accessing the data storage device.

21. The logic of claim 17, wherein the more optimal selection of the read/write heads is based on empirical knowledge of the data storage device's performance.

22. The logic of claim 17, further comprising dynamically re-programming the data storage device in order to perform the re-mapping step.

23. The logic of claim 22, wherein the dynamically re-programing step is performed during manufacturing of the data storage device.

24. The logic of claim 22, wherein the dynamically re-programming step is performed during field engineering of the data storage device.

* * * * *